United States Patent
Paggi et al.

(10) Patent No.: US 6,273,203 B1
(45) Date of Patent: Aug. 14, 2001

(54) AGRICULTURAL MACHINE WITH A SELF-LEVELING CAB

(75) Inventors: Bruno Paggi, Treviglio; Felice Contessini, Milan, both of (IT)

(73) Assignee: Same Deutz-Fahr SpA (IT)

( * ) Notice: Subject to any disclaimer, the term of this patent is extended or adjusted under 35 U.S.C. 154(b) by 0 days.

(21) Appl. No.: 09/419,329

(22) Filed: Oct. 15, 1999

(30) Foreign Application Priority Data

Oct. 16, 1998 (EP) .................................................. 98830616

(51) Int. Cl.[7] .................................................. B62D 33/067
(52) U.S. Cl. .................. 180/89.13; 280/6.15; 280/6.154
(58) Field of Search .............................. 180/89.12, 89.13, 180/89.14; 280/6.15, 6.154

(56) References Cited

U.S. PATENT DOCUMENTS

| | | |
|---|---|---|
| 3,703,298 | 11/1972 | Laverda . |
| 3,917,295 | 11/1975 | Hiruma . |
| 4,440,093 | 4/1984 | Kakehi . |
| 5,337,847 | 8/1994 | Woods et al. . |
| 5,623,410 * | 4/1997 | Furihata et al. .................. 180/89.13 |
| 5,684,698 | 11/1997 | Fujii et al. . |
| 5,941,920 * | 8/1999 | Schubert ........................... 180/89.13 |

FOREIGN PATENT DOCUMENTS

| | | |
|---|---|---|
| 2 640 206 | 6/1990 | (FR) . |
| 1-094007 | 4/1989 | (JP) . |
| 3-186485 | 8/1991 | (JP) . |
| 7-276958 | 10/1995 | (JP) . |

* cited by examiner

Primary Examiner—Kenneth R. Rice
(74) Attorney, Agent, or Firm—Cantor Colburn LLP

(57) ABSTRACT

An agricultural machine, comprising a pair of from wheels and a pair of rear wheels, rigidly connected to a main frame, a control cab mounted on the main frame and suspension means placed between the cab and the main frame. Suspension means comprise a plurality of actuators for controlling the rotation of the cab with respect to the main frame about at least two axis orthogonal to each other. An electronic control unit is provided with sensor means for detecting variations of the cab tilt angle with respect to an horizontal reference direction. The electronic control unit is programmed for controlling said actuators so as to maintain a constant orientation of the cab with respect to said reference direction.

10 Claims, 3 Drawing Sheets

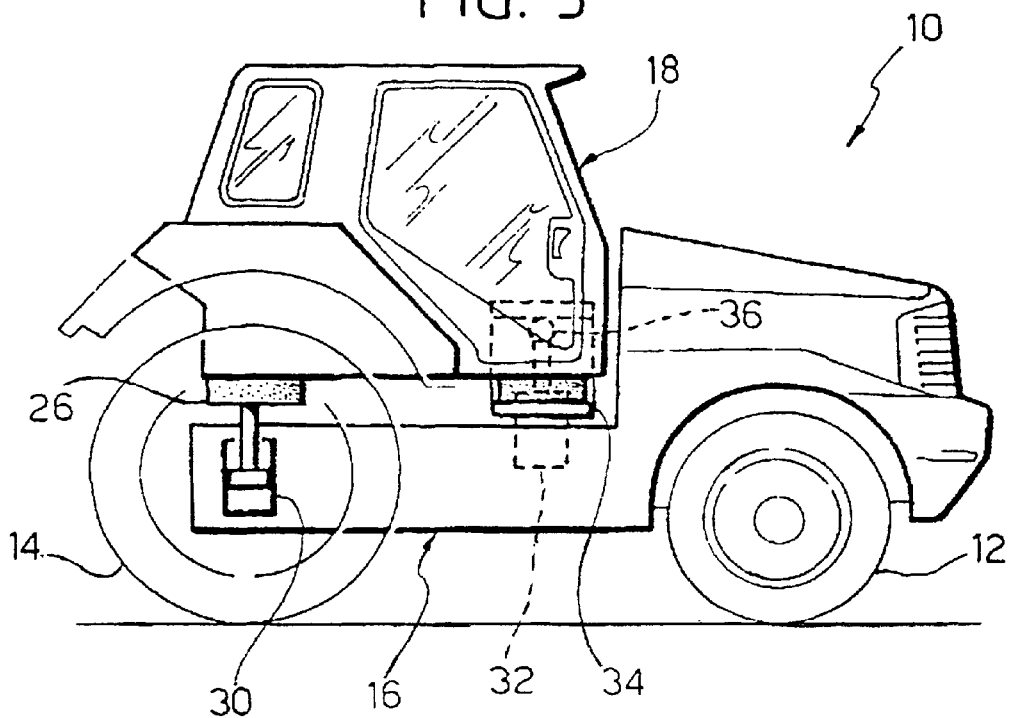
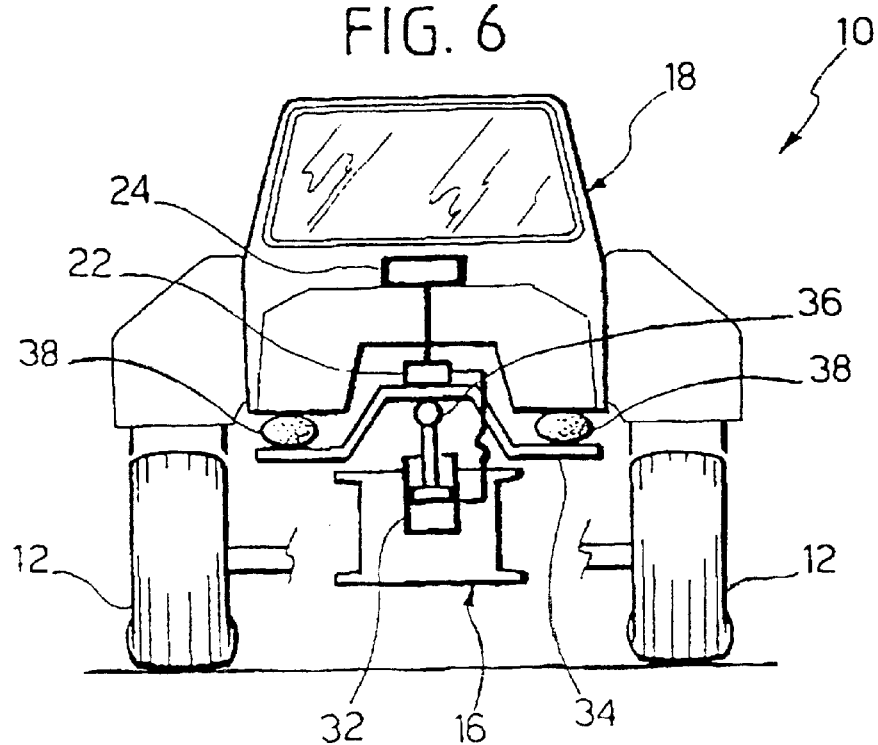

AGRICULTURAL MACHINE WITH A SELF-LEVELING CAB

TECHNICAL FIELD

The present invention relates to an agricultural machine.

BACKGROUND OF THE INVENTION

The invention has been developed in particular in view of the application on agricultural tractors of the type comprising:

- a pair of rear wheels rigidly connected to a main frame, and a pair of front wheels carried by a front axle mounted for oscillatory movement about a longitudinal axis of the tractor,
- a control cab mounted on the main frame, and
- suspension means interposed between the cab and the main frame.

Agricultural machines often operate in non-levelled working conditions, due to either ground configuration (e.g. hilly ground) or to specific operations such as furrow plowing in which even on level ground the tractor is transversally tilted.

In all these conditions, the operator loses a major part of the comfort which the cab can provide on horizontal ground. In fact, longitudinal inclinations of the tractor can be compensated only by forces applied with the legs on the floor and with the arms on the driving wheel, whereas transversal inclinations are compensated because the operator leans on the seat armrests. These positions can be very troublesome for the operator after a few working hours both for lower and upper limbs fatigue and for stiffening of the hips which continuously rest on the lateral armrests. This produces, in addition to a concentration drop, also a reduced productivity of the tractor.

U.S. Pat. No. 4,018,296 shows a self-levelling tractor which automatically levels the main frame of the tractor with respect to the front and rear axle and to the tractor wheels. The tractor axles are mounted for oscillatory movement about a common axis which extends in a longitudinal direction below the main frame and a pair of hydraulic cylinders are arranged between the main frame and the rear axle. A mercury levelling unit is mounted to the main frame and actuates the hydraulic cylinders to pivot the main frame to horizontal when the rear axis and its wheels are tilted because of the terrain angle.

The structure disclosed in U.S. Pat. No. 4,018,296 requires heavy modifications of the tractor structure for rendering the rear axle pivotable with respect to the main frame.

SUMMARY OF THE INVENTION

The object of the present invention is to provide an agricultural machine which provides high comfort levels on sloped grounds and which maintains the classic structure of a tractor, that is with rear wheels rigidly connected to the main frame.

According to the present invention, this object is achieved by an agricultural machine having the features forming the subject of the claims.

BRIEF DESCRIPTION OF THE DRAWINGS

The present invention now will be disclosed in detail with reference to the attached drawings, provided purely by way of non-limiting example, in which.

DETAILED DESCRIPTION OF THE PREFERRED EMBODIMENT

Figure 1:
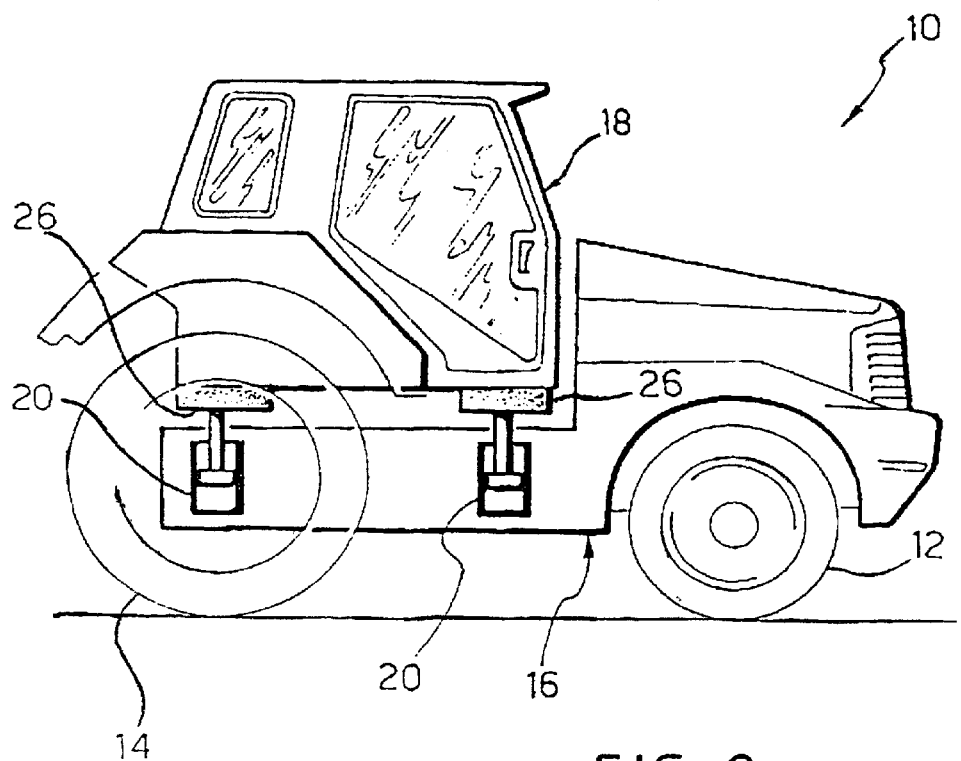
FIGS. 1 and 2, respectively, are front and rear schematic views showing an agricultural machine according to a first embodiment of the present invention.
Figure 2:
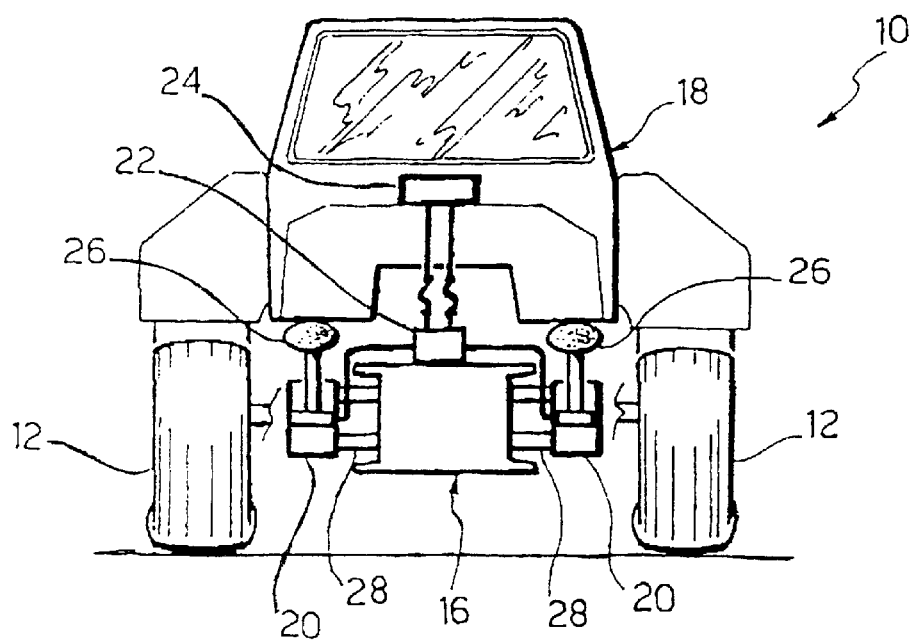

With reference to FIGS. 1 to 4, 10 indicates an agricultural tractor comprising, in a conventional way, a pair of front wheels 12 and a pair of the rear wheels 14. The rear wheels 14 are rigidly connected to a main frame 16 whereas the front wheels are carried by a front axle (not shown) which normally is free to pivot about a longitudinal axis of the tractor. The front axle can also be connected to the frame by means of a suspension.

The tractor according to the present invention comprises a cab 18 which is connected to the main frame 16 through a suspension system enabling a completely autonomous movement of the cab with respect to the frame, in order to ensure that the cab remains constantly horizontal for a certain range of terrain slope, both in transversal and longitudinal directions. Therefore, the operator constantly works with an horizontal cab, independently of the ground conditions.

In the embodiment shown in FIGS. 1 to 4, the suspension system comprises four hydraulic or pneumatic actuators 20 placed between the cab 18 and the main frame 16. Each actuator 20 is connected to the cab 18 by means of a wide-stroke elastic support 26 which has the dual function of damping medium and high frequency vibrations produced both by the engine and the ground and to compensate angular tilt between the cab 18 and the main frame 16.

The actuator 20 are controlled by a valve unit 22 which in its turn is controlled by an electronic unit 24 placed into the cab 18. The electronic unit 24 is provided with sensors which detect the cab angular tilt. On the basis of information provided by such sensors, the electronic unit 24 controls the actuators 20 for compensating the cab tilt, so that the cab 18 remains horizontal for any tilt both transversal and longitudinal, of the main frame 16 comprised in a predetermined range.

The sensors which detect the cab tilt may be:

1) either a biaxial inclinometer or two monoaxial inclinometers orthogonal to each other, plus either a biaxial turnmeter or two monoaxial turnmeters orthogonal to each other; or
2) either a biaxial gyroscope or a double monoaxial gyroscope; or
3) either a biaxial inclinometer or two monoaxial inclinometers orthogonal to each other, plus a sensor which detects the direction of the earth magnetic field; or
4) either a biaxial inclinometer or two monoaxial inclinometers orthogonal to each other, without turnmeter.

The sensors indicated at points 1–3 enable a variation of the cab trim only as a function of actual tilts due to the terrain, without feeling the effects of either lateral acceleration (centrifugal acceleration during a turn) or longitudinal accelerations (acceleration generated during starting or breaking). The sensors described at point 4 are different from the preceding ones in that they are affected also by lateral and longitudinal accelerations. Therefore, while the sensors described at points 1–3 tend to maintain the cab horizontal in any situation, the sensors described at point 4 tend to maintain the resultant of accelerations always orthogonal to the cab floor and produce an undesired tilt of the cab when the tractor is subjected to transversal or longitudinal accelerations. Therefore, it is provided that the sensor described at point 4 can be used for an active control of the cab only when the tractor operates on a field and that they are not active when the tractor moves on a road. For example, the control system of the cab suspension could be automatically turned-off when the tractor exceeds a predetermined speed, for example of 10 Km/h.

The actuators 20 is preferably of a double-acting type and are rigidly anchored to the main frame 16 by means of support brackets schematically indicated at 28. The valve unit 22 comprises four on-off or proportional solenoid valves which control the movement of respective actuators.

This cab levelling system provides a real good comfort, absolutely non comparable with that of conventional cabs. This levelling system can be manually turned on or off. In addition, it could be provided with means for selecting either the levelling to be carried out in any direction or to compensating only transversal or longitudinal tilt angles. In addition, the control unit 24 could be provided with a visual and acoustical alarm system for warning the operator of a roll over danger when the tilt angle of the frame 16 exceeds a danger value. This condition could be announced for example by the fact that one or more of the actuators has reached its end of stroke position. Finally, the cab 18 could be raised or lowered parallel to itself both for providing a better visibility in conditions wherein the tractor operates on level ground, and for improving accessibility between the cab and the main frame 16 during maintenance operations.

Figure 3:
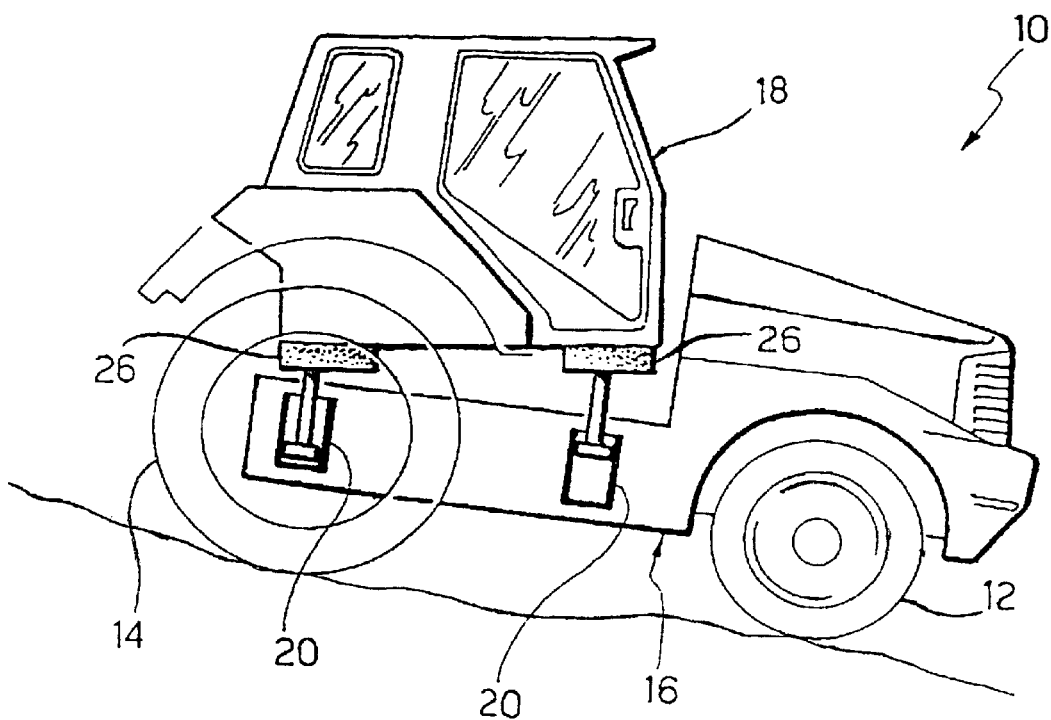
FIGS. 3 and 4 are schematic views showing the machine of the FIGS. 1 and 2 during operation on a sloped terrain, both in longitudinal and transversal direction, and FIGS. 5 and 6, respectively, are side and front elevation views of an agricultural machine according to a second embodiment of the present invention.
Figure 4:
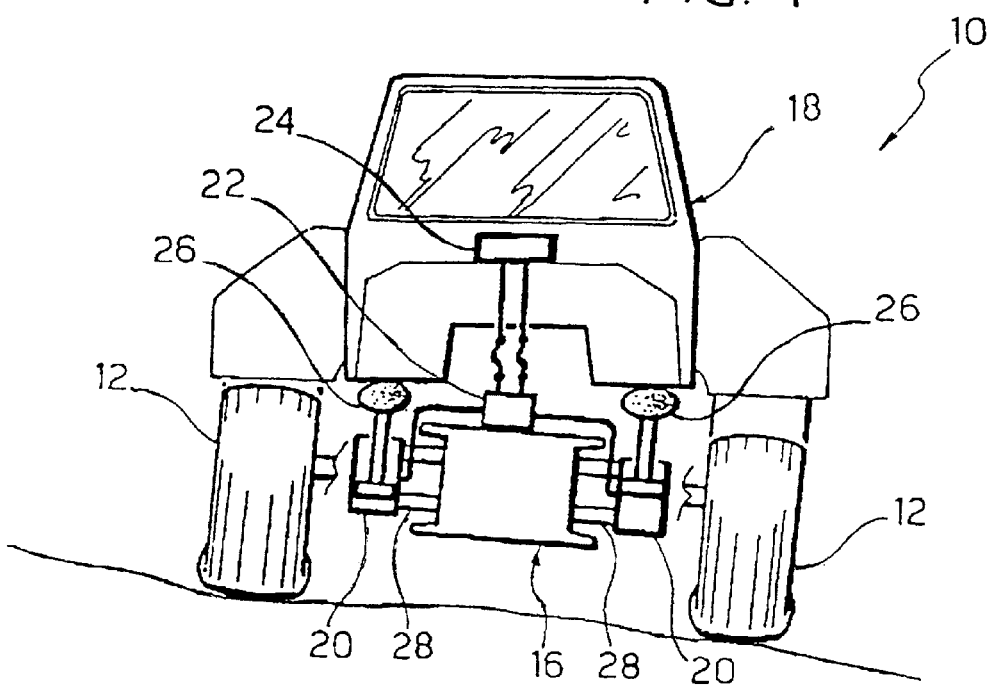

FIGS. 3 and 4 show schematically the way in which the actuators 20 compensate longitudinal and transversal tilts. It will be understood that four actuators placed in correspondence with the cab corners can maintain the cab horizontal also in driving conditions wherein the main frame 16 has both a longitudinal and a transversal tilt.

In the variant shown in FIGS. 5 and 6, the cab suspension system comprises two rear actuators 30 and a single front actuator 32 articulated to a cross beam 34 by means of a ball joint 36. The cross beam 34 is connected to the cab 18 by means of a pair of elastic supports 38. Also this solution enables a contemporaneous compensation both of longitudinal and transversal inclinations, by virtue of the fact that the cross beam 34 can freely rotate about the ball joint 36.

What is claimed is:

1. An agricultural machine, comprising:
  a pair of rear wheels, rigidly connected to a main frame, and a pair of front wheels connected to the main frame by means of a front axle;
  a control cab mounted on the main frame; and
  suspension means placed between the cab and the main frame, said suspension means including a plurality of actuators adapted to control the rotation of the cab with respect to the main frame about at least two axis orthogonal to each other; and
  an electronic control unit provided with sensor means for detecting variations of the tilt angle of the cab with respect to a horizontal reference direction, the electronic control unit being programmed for controlling said actuators so as to maintain constant the orientation of the cab with respect to said horizontal references direction;
  wherein said sensor means are not effected by variations of the cab tilt angle due to either transversal or longitudinal acceleration of the machine.

2. An agricultural machine according to claim 1, wherein said sensor means is chosen from the group consisting of a biaxial gyroscope and a double monoaxial gyroscope.

3. An agricultural machine according to claim 1, wherein said sensor means includes:
  an inclinometer member chosen from the group consisting of a biaxial inclinometer and two monoaxial inclinometers; and
  a sensor which detects the direction of the earth magnetic field.

4. An agricultural machine according to claim 1, further including alarm means for announcing a tilt condition of the main frame exceeding a predetermined safety threshold.

5. An agricultural machine according to claim 1, wherein said sensor means includes:
  an inclinometer member chosen from the group consisting of a biaxial inclinometer and two monoaxial inclinometers orthogonal to each other; and a turnmeter member chosen from the group consisting of a biaxial turnmeter and two monoaxial turnmeters.

6. An agricultural machine according to claim 1, wherein it comprises four linear actuators placed in correspondence with the corners of the cab.

7. An agricultural machine according to claim 1, wherein said suspension system comprises a pair of linear actuators connected to the cab by means of respective elastic supports and a third linear actuator articulated to a cross beam by means of a ball joint, said cross beam being connected to the cab by means of a pair of elastic supports.

8. An agricultural machine according to claim 1, wherein said suspension means are adapted to raise or lower the cab parallel to itself, both for providing a better visibility in conditions in which the tractors operates on a level ground, and for improving accessibility between the cab and the main frame during maintenance operations.

9. An agricultural machine, comprising:
  a pair of rear wheels, rigidly connected to a main frame, and a pair of front wheels connected to the main frame by means of a front axle;
  a control cab mounted on the main frame; and
  suspension means placed between the cab and the main frame,
  wherein said suspension means comprise a plurality of actuators adapted to control the rotation of the cab with respect to the main frame about at least two axis orthogonal to each other, and wherein the agricultural machine comprises an electronic control unit provided with sensor means for detecting variations of the tilt angle of the cab with respect to a horizontal reference direction, and wherein said electronic control unit is programmed for controlling said actuators so as to maintain constant the orientation of the cab with respect to said horizontal reference direction, and said electronic control unit can be set out for compensating cap tilt angles only in a transversal direction or only in a longitudinal direction.

10. An agricultural machine, comprising:
  a pair of rear wheels, rigidly connected to a main frame, and a pair of front wheels connected to the main frame by means of a front axle;
  a control cab mounted on the main frame; and
  suspension means placed between the cab and the main frame, said suspension means including a plurality of actuators adapted to control the rotation of the cab with respect to the main frame about at least two axis orthogonal to each other; and
  an electronic control unit provided with sensor means for detecting variations of the tilt angle of the cab with respect to a horizontal reference direction, the electronic control unit being programmed for controlling said actuators so as to maintain constant the orientation of the cab with respect to said horizontal reference direction; and wherein said sensor means is an inclinometer chosen from the group consisting of a biaxial inclinometer and two monoaxial inclinometers.

* * * * *